Jan. 13, 1948.   A. C. HARDY ET AL   2,434,561
COLOR FACSIMILE
Filed Aug. 6, 1946   7 Sheets-Sheet 1

Jan. 13, 1948.        A. C. HARDY ET AL        2,434,561
COLOR FACSIMILE
Filed Aug. 6, 1946        7 Sheets-Sheet 7

INVENTORS
Arthur C. Hardy and
BY Edward C. Dench
Byerly, Watson & Simonds
ATTORNEYS Patented Jan. 13, 1948

2,434,561

UNITED STATES PATENT OFFICE 2,434,561

COLOR FACSIMILE

Arthur C. Hardy, Wellesley, Mass., and Edward C. Dench, West Hartford, Conn., assignors to Interchemical Corporation, New York, N. Y., a corporation of Ohio Application August 6, 1946, Serial No. 688,749

25 Claims. (Cl. 178—5.2)

This invention relates to the art of color reproduction and provides a method and apparatus by means of which the colors of an original may be exactly reproduced by printing superimposed impressions from structured printing plates.

The invention is of special advantage when used in the so-called four-color method in which a black plate is used in addition to three colored plates. It may also be used in the three-color method.

The technical advantages of the four-color method—sharpness of detail, the saving of colored ink, and facilitating trapping—have long been recognized. In the usual theory of the four-color method, it is proposed to print the black ink at the points where all three of the colored inks would be superimposed in the three-color method; but in applying this theory in practice, and also in the practice of the three-color method, the effect of the overlapping dots of the different inks has been neglected so that an accurate reproduction has not been obtained without extensive hand retouching.

Neugebauer (Zeits. f. Tech. Physik, 36, 22–89, 1937) has shown that the color of a reproduction produced by three-color half-tone printing is an additive mixture of eight colors—the colors of the paper, the three colored inks, superimposed impressions of the three pairs of the three colored inks, and superimposed impressions of all three colored inks. By use of the theory of probabilities, Neugebauer obtained a rigorous expression for the color stimulus of any element (a region of the picture which appears uniformly colored when viewed at such a distance that the dot structure cannot be resolved) of such a reproduction, which is as follows:

*Neugebauer equation*

$$\begin{aligned}
S = &(1-c)(1-m)(1-y)S_w \\
&+ c(1-m)(1-y)S_c \\
&+ m(1-c)(1-y)S_m \\
&+ y(1-m)(1-c)S_y \\
&+ cm(1-y)S_{cm} \\
&+ cy(1-m)S_{cy} \\
&+ my(1-c)S_{my} \\
&+ cmy\, S_{cmy}
\end{aligned} \quad (1)$$

where $S$ is the space vector measuring the color stimulus of an element of the reproduction, $S_w \ldots S_{cmy}$ are the space vectors measuring the color stimuli of the eight colors mentioned above, and $c$, $m$ and $y$ are the printing surfaces of the parts of the three printing plates corresponding to the element in question expressed as fractions of the area of the element. The product functions of $c$, $m$ and $y$ in this equation represent the fractional areas which each of the eight colors would have in the element in question if a random distribution of the differently colored half-tone dots were assumed. Neugebauer showed that the results of this assumption accord with measurements of actual half-tone reproductions.

The equality of the space vectors of the Neugebauer equation requires equality between each of the three coordinates or tristimulus values corresponding to the vectors so that, by introducing the tristimulus values $X$, $Y$ and $Z$ corresponding to each space vector $S$, the Neugebauer equation may be written as three simultaneous equations.

*Neugebauer tristimulus equations*

$$\begin{aligned}
X = &(1-c)(1-m)(1-y)X_w + c(1-m)(1-y)X_c + m(1-c)(1-y)X_m \\
&+ y(1-c)(1-m)X_y + my(1-c)X_{my} + cy(1-m)X_{cy} \\
&+ cm(1-y)X_{cm} + cmy\, X_{cmy}
\end{aligned} \quad (1a)$$

$$\begin{aligned}
Y = &(1-c)(1-m)(1-y)Y_w + c(1-m)(1-y)Y_c + m(1-c)(1-y)Y_m \\
&+ y(1-c)(1-m)Y_y + my(1-c)Y_{my} + cy(1-m)Y_{cy} \\
&+ cm(1-y)Y_{cm} + cmy\, Y_{cmy}
\end{aligned} \quad (1b)$$

$$\begin{aligned}
Z = &(1-c)(1-m)(1-y)Z_w + c(1-m)(1-y)Z_c + m(1-c)(1-y)Z_m \\
&+ y(1-c)(1-m)Z_y + my(1-c)Z_{my} + cy(1-m)Z_{cy} \\
&+ cm(1-y)Z_{cm} + cmy\, Z_{cmy}
\end{aligned} \quad (1c)$$

Neugebauer gave no solution of his equations and did not suggest any way in which they could be used to determine the values of the proportional printing areas of the three plates in advance of the printing. Yule has recently stated in reference to the work of Neugebauer: "a method of color reproduction cannot be based on this work until Neugebauer's equations have been solved." (J. O. S. A. 28, 419 (1938)).

The Neugebauer equation may be extended to obtain an expression for the color of an element of a reproduction made by the four-color method:

*Four-color space-vector equation*

$$S=(1-c)(1-m)(1-y)(1-n)S_w+c(1-m)(1-y)(1-n)S_c \\ +m(1-c)(1-y)(1-n)S_m+y(1-c)(1-m)(1-n)S_y \\ +n(1-c)(1-m)(1-y)S_n+my(1-c)(1-n)S_{my} \\ +cy(1-m)(1-n)S_{cy}+cm(1-y)(1-n)S_{cm} \\ +cn(1-m)(1-y)S_{cn}+mn(1-c)(1-y)S_{mn} \\ +yn(1-c)(1-m)S_{yn}+cmy(1-n)S_{cmy}+myn(1-c)S_{myn} \\ +cyn(1-m)S_{cyn}+cmn(1-y)S_{cmn} \\ +cmynS_{cmyn} \quad (2)$$

The significance of the symbols is the same as before except that $n$ is the proportional printing area of the black printer and additional coefficients have been introduced to represent the space vectors corresponding to the color stimuli of all possible combinations of the inks in which the black ink occurs. The equation may be simplified because of the fact that the color stimuli of areas in which the black ink is printed with one or more colored inks are practically the same as that of the areas in which the black ink is printed alone. In other words, $$S_{cn}=S_{mn}=S_{yn}=S_{myn}=S_{cyn}=S_{cmn}=S_{cmyn}=S_n \quad (3)$$

Substituting $S_n$ for the coefficients to which it is equal and collecting terms, Equation (2) reduces to $$S=(1-c)(1-m)(1-y)(1-n)S_w+c(1-m)(1-y)(1-n)S_c \\ +m(1-c)(1-y)(1-n)S_m+y(1-m)(1-c)(1-n)S_y \\ +cm(1-y)(1-n)S_{cm}+cy(1-m)(1-n)S_{cy} \\ +my(1-c)(1-n)S_{my}+cmy(1-n)S_{cmy}+nS_n \quad (4)$$

In order to indicate the effect of introducing a black-ink printing plate, Equations 1 and 4 may be compared term by term:

$$S=(1-c)(1-m)(1-y)S_w \\ +c(1-m)(1-y)S_c \\ +m(1-c)(1-y)S_m \\ +y(1-m)(1-c)S_y \\ +cm(1-y)S_{cm} \\ +cy(1-m)S_{cy} \\ +my(1-c)S_{my} \\ +cmyS_{cmy} \quad (1)$$

$$S=(1-c)(1-m)(1-y)(1-n)S_w \\ +c(1-m)(1-y)(1-n)S_c \\ +m(1-c)(1-y)(1-n)S_m \\ +y(1-m)(1-c)(1-n)S_y \\ +cm(1-y)(1-n)S_{cm} \\ +cy(1-m)(1-n)S_{cy} \\ +my(1-c)(1-n)S_{my} \\ +cmy(1-n)S_{cmy} \\ +nS_n \quad (4)$$

It is evident from this comparison that the color of an element of the four-color reproduction consists of an additive combination of nine colors which consist of the eight colors considered by Neugebauer with the addition of the color of the black ink. It is evident from the from of the equations that in order that the color stimulus S given by Equation 4 be equal to that given by Equation 1, the value of at least one of $c$, $m$ and $y$ must be less in Equation 4 than in Equation 1 if $n$ has any value greater than 0. This means that in order to make the color of a reproduction by the four-color method the same as that produced by the three-color method, the proportional printing area of at least one of the color plates must be less in the four-color method than that of the plate used for the corresponding color in the three-color method. As $n$ in Equation 4 is increased above 0 while S is maintained unchanged, at least one of $c$, $m$ and $y$ will be reduced until it becomes negative. Since a negative proportional printing area has no physical meaning, the color stimulus S cannot be attained if $n$ exceeds the value at which one of $c$, $m$ and $y$ becomes 0. This may be termed the critical value of $n$ in Equation 4 because any value of $n$ below this will make $c$, $m$ and $y$ all positive, so that they will represent proportional printing areas which can be used in practice.

In order to achieve the maximum benefits of the four-color method, $n$ should be made equal to its critical value so that one of $c$, $m$ and $y$ will be 0. It can be seen from Equation 4 that if any one of $c$, $m$ and $y$ is 0, the next to the last term of the equation will disappear so that there will be no area in which the three colored inks are overprinted without any black ink. This, in general, is the result sought in the four-color method. Attempts have been made to attain it by making the proportional printing area of the black printer at each element equal to the proportional printing area of the one of the three color plates of the corresponding three-color process which has the smallest proportional printing area at its element. This conventional value for the proportional printing area of the black printer is not the same as the critical value of $n$ in Equation 4 and, therefore, does not produce the intended result.

The simplified space-vector four-color Equation 4 may be written as three simultaneous equations as follows:

*Four-Color tristimulus equations*

$$X=(1-c)(1-m)(1-y)(1-n)X_w+c(1-m)(1-y)(1-n)X_c \\ +m(1-c)(1-y)(1-n)X_m+y(1-m)(1-c)(1-n)X_y \\ +cm(1-y)(1-n)X_{cm}+cy(1-m)(1-n)X_{cy} \\ +my(1-c)(1-n)X_{my}+cmy(1-n)X_{cmy}+nX_n \quad (5a)$$

$$Y = (1-c)(1-m)(1-y)(1-n)Y_w + c(1-m)(1-y)(1-n)Y_c$$
$$+ m(1-c)(1-y)(1-n)Y_m + y(1-m)(1-c)(1-n)Y_y$$
$$+ cm(1-y)(1-n)Y_{cm} + cy(1-m)(1-n)Y_{cy}$$
$$+ my(1-c)(1-n)Y_{my} + cmy(1-n)Y_{cmy} + nY_n \quad (5b)$$

$$Z = (1-c)(1-m)(1-y)(1-n)Z_w + c(1-m)(1-y)(1-n)Z_c$$
$$+ m(1-c)(1-y)(1-n)Z_m + y(1-m)(1-c)(1-n)Z_y$$
$$+ cm(1-y)(1-n)Z_{cm} + cy(1-m)(1-n)Z_{cy}$$
$$+ my(1-c)(1-n)Z_{my} + cmy(1-n)Z_{cmy} + nZ_n \quad (5c)$$

If the tristimulus values X, Y and Z be taken as those of an element of the original to be reproduced and the twenty-seven tristmulus values $X_w \ldots Z_n$ be based on the color of the paper and inks to be used in the reproduction, the three equations contain four unknowns, $c$, $m$, $y$ and $n$, the proportional printing areas of the four printing plates at the element in question. Since there is one more unknown than the number of equations, the equations are not soluble even in theory. But a fourth relation between the four unknowns may be obtained by introducing the condition that $n$, the proportional printing area for the black ink, be equal to the critical value of $n$, that is, the value which reduces at least one of the other three unknowns, $c$, $m$ and $y$, to 0. With this additional condition, Equations 5, 5b, 5c may in theory be solved to determine in advance the proportional printing area for each ink required at each element of an exact reproduction of an original. The present invention involves obtaining such solution.

All the tristimulus values in the equations can be determined by colorimetric measurements. The tristimulus values on the right-hand sides of the equations ($X_w \ldots Z_n$) are constants for the whole picture and for any other pictures to be printed in the same way with the same four inks on the same paper. The tristimulus values X, Y and Z are, of course, different for each element of the original and may be determined by scanning the original.

For the sake of illustration, Equations 5a, 5b and 5c are rewritten in expanded form with the tristimulus values obtained by measurement for a typical set of cyan, magenta, yellow and black process inks and a greenish-blue element of a colored original:

$$0.3223 = 1 - .8538c - .5581m - .1431y - .99n$$
$$+ .4448cm + .0610cy + .0988my + .8538cn$$
$$+ .5581mn + .1431ny - .4448cmn - .0610cny$$
$$- .0988mny - .0265cmy + .0265cmny \quad (6a)$$

$$0.3135 = 1 - .8028c - .7809m - .0203y - .99n$$
$$+ .5974cm + .0192cy + .0067my + .8028cn$$
$$+ .7809mn + .0203ny - .5974cmn - .0192cny$$
$$- .0067mny - .0004cmy + .0004cmny \quad (6b)$$

$$0.4669 = 1 - .3871c - .8155m - .8521y - .99n$$
$$+ .3221cm + .3423cy + .6796my + .3871cn$$
$$+ .8155mn + .8521ny - .3221cmn - .3423cny$$
$$- .6796mny - .2729cmy + .2729cmny \quad (6c)$$

In this form, it is evident that the three equations contain four unknowns $c$, $m$, $y$ and $n$. With the added condition that $n$ is equal to the critical value above mentioned, the three equations fix definite values for $c$, $m$, $y$ and $n$, but no usable mathematical method for solving them for these unknowns has been found.

In accordance with the invention, they are solved by an electrical method and apparatus which operates with great rapidity. Our electrical computing apparatus consists of means for computing the value of the right-hand side of each equation from arbitrarily assumed values of $c$, $m$, $y$ and $n$ and then comparing the computed values of the right-hand sides of the equation with the known values of X, Y and Z obtained from scanning the original, using the differences to adjust the arbitrary values of $c$, $m$, $y$ and $n$ to values which give substantial equality between the two sides of each equation, and at the same time using the smallest one of the arbitrary values of $c$, $m$ and $y$ to adjust the arbitrary value of $n$ until this smallest one is substantially equal to 0.

Our method of color reproduction involves (1) determining the intensities of three different spectral components of the colors of the paper to be used in the reproduction, of the inks to be used in the reproduction, and of the overprint combinations of the inks, and setting these determinations into the computing apparatus as the tristimulus values $X_w \ldots Z_n$ of the Equations 5a, 5b, 5c, (2) determining the intensities of three spectral components of the color of each successive element of the original and setting these determinations into the computing apparatus as representing the tristimulus values X, Y, Z at successive points of the original, and (3) recording the electrically compueted values of $c$, $m$, $y$ and $n$.

It is implicit in the equations that X, Y, Z and $X_w \ldots Z_n$ represent tristimulus values in the same colorimetric system. In order that the intensities of the spectral components of the paper, ink and overprints and the intensities of the spectral components of successive elements of the original may represent values in the same colorimetric system, the same three spectral components[1] of the colors must be used in each set of determinations. This is essential in carrying out our method.

In order that the spectral component intensity determinations may truly represent tristimulus values, it is necessary that the three receptors by which the components are separated have spectral sensitivities which are linear transformations of the color mixture curves for some set of basic stimuli such as those recommended by the International Commission on Illumination in 1931. Compliance with the latter requirement enables our method to give theoretically correct reproductions of all subjects whose colors can be reproduced by the colored inks employed. It has been found in practice, however, that in many cases, and particularly where the colored original is a printed picture, this requirement is not essential.

In order that the invention may clearly be understood, a specific application of it to the four-color method of reproduction will be described. It will then be indicated how it may be used in connection with three-color reproduction.

---

[1] By "the same spectral component" of two colors, we mean the part or component of the light emitted by the colors in the same particular spectral region, or specifically, the components of the light from the colors received by the same receptor or by two receptors of the same spectral sensitivity (see definitions on page 1 of U. S. Patent 2,193,722, issued to one of us on March 12, 1940).

Figure 1:
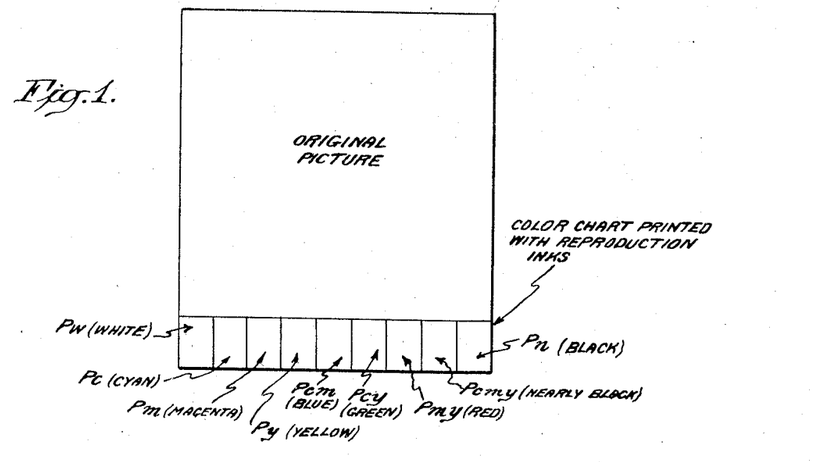
Fig. 1 is a diagram of an original colored picture to be reproduced and a color chart printed with the reproduction inks.

In such description, reference will be made to the accompanying drawings in which:

Fig. 1 represents the original colored picture to be reproduced and a color chart made by printing with the inks to be used in the reproduction on the paper to be used in the reproduction. The chart contains nine patches as follows:

$P_w$—bare paper (approximately white).
$P_c$—cyan ink.
$P_m$—magenta ink.
$P_y$—yellow ink.
$P_{cm}$—overprint of cyan and magenta inks (approximately blue).
$P_{cy}$—overprint of cyan and yellow inks (approximately green).
$P_{my}$—overprint of magenta and yellow inks (approximately red).
$P_{cmy}$—overprint of the three colored inks (nearly black).
$P_n$—black ink (approximately black).

The first step in the preferred embodiment is to make three photographs of the original picture and the color chart on three separate filter-emulsion combinations whose spectral sensitivities are linear transformations of the color mixture curves for some set of basic stimuli, such as those recommended by the International Commission on Illumination in 1931. A satisfactory approximation to such filter-emulsion combinations is obtained by using a panchromatic emulsion and taking the three photographs through Wratten separation filters A, B and C5. Three positive photographs made in this way with proper exposure and development have transparencies at all points substantially proportional to three tristimulus values of the color stimulus of the color at the corresponding point of the original. They constitute what is customarily termed a set of uncorrected color separations, because a reproduction made by means of them will differ widely from the original, even if an additive method of reproduction is used.

Figure 2:
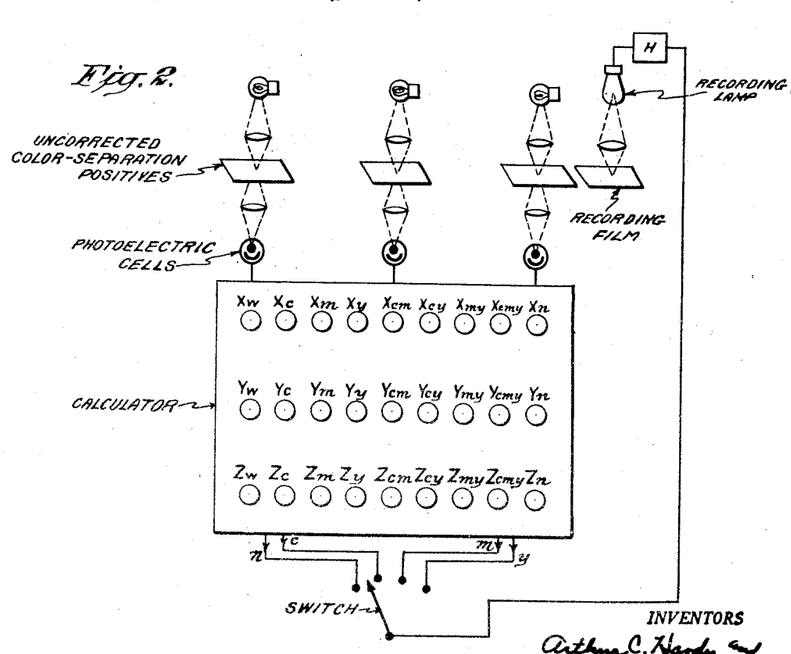
Fig. 2 is a block diagram of apparatus for making corrected color-separation images.

Fig. 2 indicates the general arrangement of a complete machine for utilizing the three uncorrected color-separation images of the original and the color chart made with the reproduction inks to make corrected color-separation images for engraving the plates from which the cyan, magenta, yellow and black inks must be printed to reproduce the color stimulus of the original. The machine includes a scanning and recording device for giving corresponding movements to the three separation photographs and a recording film. This device may be constructed as shown in Wurzburg Patent 2,185,139, issued December 26, 1939.

The three photocells receiving the light which has passed through the three photographs transmit into a calculator signals proportional to the three tristimulus values X, Y and Z of the element of the original corresponding to the element of the photographs through which the light is passed. The calculator solves the Four-color Tristimulus Equations 5a, 5b and 5c for the critical value of $n$, and puts out four signals equal to the values $c$, $m$, $y$ and $n$ which are the proportions of printing area required at the corresponding element of the four printing plates. The images for engraving the four plates are preferably made one at a time. For this purpose, a switch connected to a recorder may be placed on any one of the four output terminals of the calculator. The recorder most desirably includes means for making a structured image (as distinguished from a continuous-tone image). For this purpose a device H, such as that shown in Ives Patent 1,631,963, issued June 14, 1927, or that shown in Fig. 6 of Hardy Patent 2,136,340, issued November 8, 1938, is connected between the switch and the recording lamp. Less desirably, a continuous-tone image recorder may be used, but in this case the recorded image must be converted into a structured image (by some means such as photographing through a half-tone screen) before printing plates are engraved.

In order that the calculator may solve the equations, it is necessary that the constants of the equations be set into it. The calculator may be used to measure these constants, or they may be measured independently. In the former case, the three photographs are positioned so that the scanning lights pass through the patches $P_w$ of the color charts on the photographs. The signals sent into the calculator by the three photocells are then equal to $X_w$, $Y_w$ and $Z_w$. The calculator serves to measure these constants and is then adjusted to set in the constants by turning the knobs marked $X_w$, $Y_w$, $Z_w$ in Fig. 2 to correspond to the measurements made on the light passed through the photographs of the patch $P_w$. In the same way, each of the other twenty-four constants is set into the calculator. It is not until after this has been done that the photographs of the picture are scanned and the values of $c$, $m$, $y$ and $n$ recorded.

Figure 3:
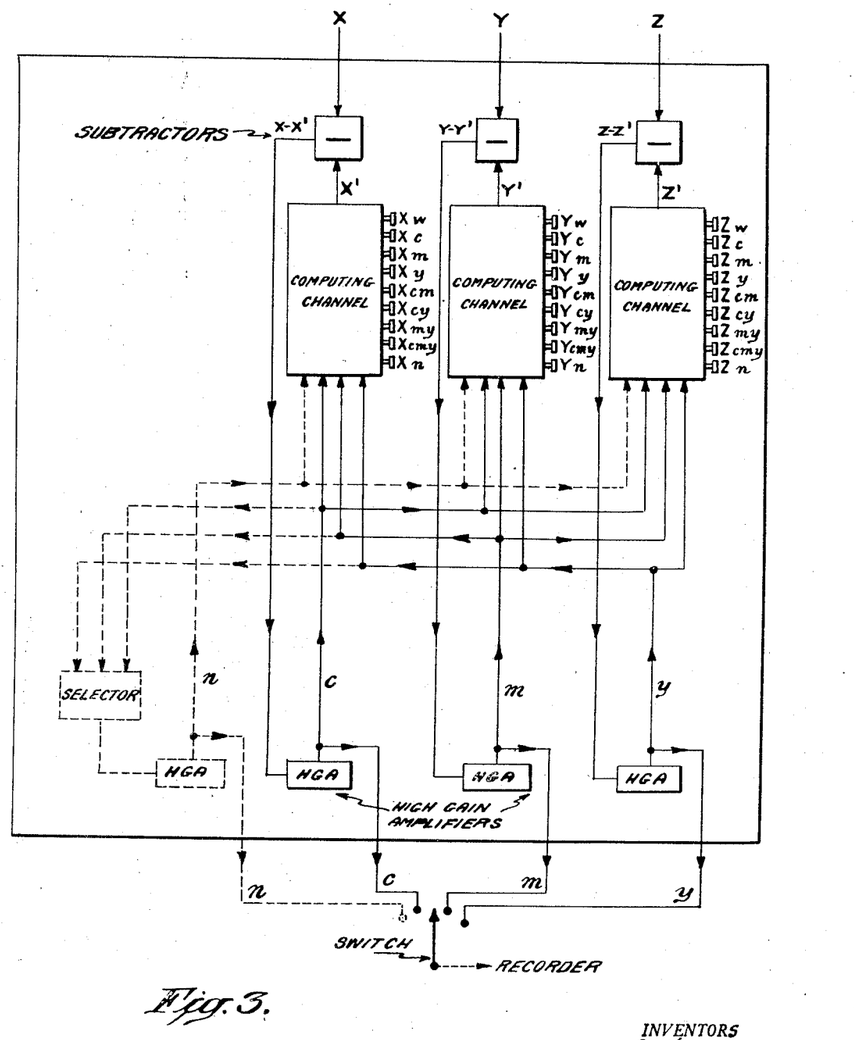
Fig. 3 is a block diagram of the calculator indicated in Fig. 2.

Fig. 3 is a block diagram of the calculator shown in Fig. 2. The three signals X, Y, Z from the photocells are led into subtractors which also receive signals X', Y', Z' from three computing channels. The subtractors put out signals X—X', Y—Y', Z—Z' which are led to three high-gain amplifiers. The amplified signals from the three amplifiers are, in the first instance, arbitrary values which may be taken as representing the three unknowns $c$, $m$, $y$. These three signals are led into a selector whose output is always equal to the smallest one of the three signals which it receives. The output of the selector is led to another high-gain amplifier. The amplified signal from this amplifier may be regarded as of arbitrary value for the unknown $n$. Each of the signals from the four amplifiers representing arbitrary values for the four unknowns $c$, $m$, $y$, $n$ is led into each of the three computing channels.

The three computing channels perform the mathematical operations indicated on the right-hand sides of Equations 5a, 5b, 5c on the four signals received by each computing channel from the high-gain amplifiers. To enable each computing channel to make the required calculation, the constants $X_w \ldots X_n$ are set into the first computing channel, the constants $Y_w \ldots Y_n$ are set into the second computing channel, the constants $Z_w \ldots Z_n$ are set into the third computing channel before the beginning of the operation.

The signals $X'$, $Y'$, $Z'$ put out by the computing channels are not, in the first instance, equal to $X$, $Y$ and $Z$ because they represent merely the required functions of arbitrary values representing the unknowns $c$, $m$, $y$, $n$. As soon as the operation starts, the calculated signals $X'$, $Y'$, $Z'$ are subtracted from the photocell signals $X$, $Y$, $Z$, reducing the signals sent from the subtractors to the amplifiers, and thereby changing the values of the signals $c$, $m$, $y$, $n$, sent into the computing channels by the amplifiers. The polarity of the computing channels is such that the changes in $c$, $m$, $y$, $n$ modify the computed values of $X'$, $Y'$, $Z'$ until $X'$ differs from $X$, $Y'$ differs from $Y$, and $Z'$ differs from $Z$ by amounts that may be made as small as desired by using sufficient amplification in the high-gain amplifiers. When this condition of substantial equality between the computed signals and photocell signals has been reached, it is evident that the values attained by the signals $c$, $m$, $y$ and $n$ are related in accordance with the three Equations 5a, 5b, 5c.

At the same time that the above operation is taking place, the relation between the signals $c$, $m$, $y$ and $n$ is adjusted to comply with the additional condition that $n$ be equal to the critical value above specified. At the first instant, the signal $n$ may be large since it consttiutes an amplification of one of the signals $c$, $m$ or $y$ made in the fourth amplifier. The introduction of a large value for $n$ into the computing channels has the effect of reducing at least one of the signals $c$, $m$ or $y$. This, in turn, decreases the size of the signal $n$ until it attains a value such that the smallest one of $c$, $m$ or $y$, that is, the output of the selector, is just sufficient to excite the fourth high-gain amplifier. When this condition of substantial equality between the output of the selector and zero has been reached, it is evident that $n$ is substantially equal to the required critical value.

As a result of these two simultaneous operations, the three Equations 5a, 5b, 5c are satisfied and the fourth condition above referred to is fulfilled, that is to say, the computed values of the right-hand sides of the three equations are made substantially equal to the photocell signals and at the same time the signal $n$ is made just large enough to reduce the smallest one of the signals $c$, $m$, $y$ substantially to zero.

The operation which has been described may be effected in not over one one-thousandth of a second. Consequently, the computed values $X'$, $Y'$, $Z'$ follow closely the values $X$, $Y$, $Z$ of the photocell signals during the scanning operation, and the outputs of the four high-gain amplifiers are always substantially equal to the required values of $c$, $m$, $y$ and $n$ required to solve the equations. The output signals of the four amplifiers are led to the output terminals of the calculator as shown in Fig. 3 from which any one of them may be led to the recorder.

It is to be noted that, in the arrangement shown in Fig. 3, the difference between the measured and computed values ($X-X'$) of Equation 5a is fed back into the circuit which controls the unknown $c$. In the same way, Equation 5b is used to control the unknown $m$, and Equation 5c to control the unknown $y$. This arrangement corresponds to the usual procedure in color reproduction wherein the amounts of the cyan, magenta and yellow inks are controlled respectively by the amounts of red, green and blue light reflected from the subject. However any of the six possible feedback connections which may be found to produce stable operation may be employed.

Our invention, in its broadest aspect, is not limited to any particular construction of the three computing channels shown in Fig. 3; but a feature of our invention consists in means for obtaining the product of a number of different factors. It appears from Equations 5a, 5b, 5c that one of the operations which must be performed by the computing channels consists in multiplying together a number of different quantities. According to a feature of our invention, this multiplication is effected on the basis of the probability principle that, if an event $a$ happens $a\%$ of the time and an event $b$ happens $b\%$ of the time, then the per cent. of the time when both events occur simultaneously is the product $a \cdot b$. To utilize this principle, a series of rectangular waves is generated for each factor to be multipled. In each series the length of the pulses is so related to the length of the spaces between the pulses that the length of a pulse divided by the length of a cycle is equal to the factor. In order to achieve accurate multiplication, the frequencies of the waves for each factor are irrationally related. The frequencies should be so selected that, when the signals are combined, all beats are of sufficiently high frequency to be filtered out or are of small amplitude compared with the amplitude of the waves representing the factors. Said frequencies may be selected for any usual or desirable rate of scanning, such for example as the rate of ten inches per second. The multiplication is effected by leading the four series of square waves representing the four factors to be multiplied to a collector which responds when pulses occur simultaneously in all four series. The collector may consist of a vacuum tube so arranged that, when all the series of pulses are led to its grid, the voltage on the grid is below cut-off except when pulses occur simultaneously in all the series. In this case, the average current from the tube is a measure of the percentage of time during which pulses occur simultaneously in all the series, and consequently represents the product.

Figure 3A:
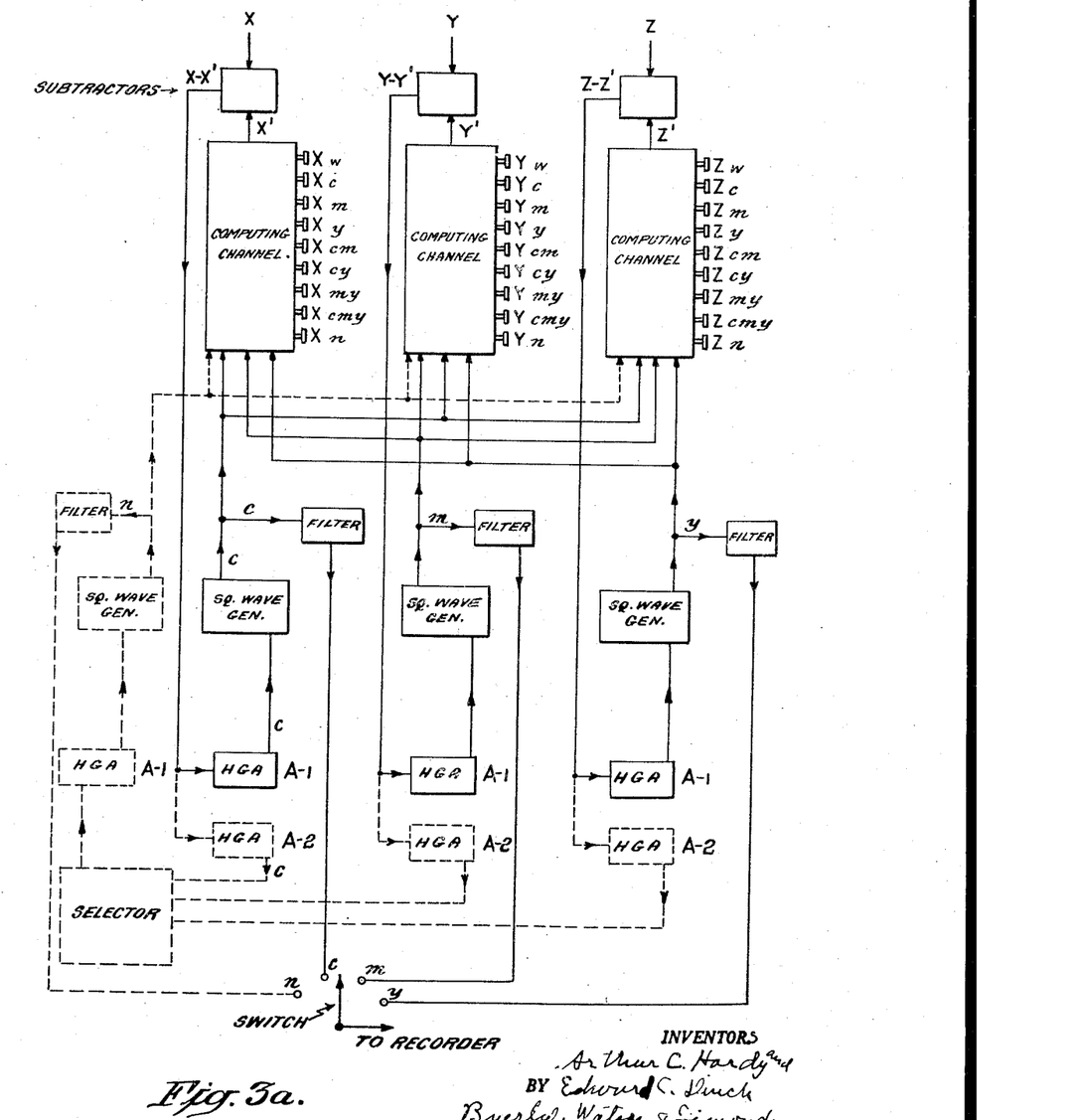
Fig. 3A is a block diagram similar to Fig. 3 showing further details of a preferred embodiment.

The details of the electrical apparatus forming the calculator may be varied greatly within the scope of our invention; but, for the sake of illustration, we will describe the particular apparatus and circuits which we have found most satisfactory:

Fig. 3A is similar to Fig. 3, but shows in more detail the arrangement of the calculator which we find most desirable to incorporate the probability method of multiplication which has been described. In this case, each of the differences $X-X'$, $Y-Y'$, $Z-Z'$, which may be a voltage signal, is led to two high-gain amplifiers connected in parallel. One of the amplifiers A—1 which receives the difference $X-X'$ puts out a voltage signal $c$ which is led to a square-wave generator which puts out the signal c in the form of a train of square waves which is led to all three computing channels. The other amplifier A—2 which receives the difference X—X' puts out a voltage signal c which is led to the selector. Amplifiers A—1 and A—2 are similar high-gain amplifiers. The use of the two amplifiers in parallel avoids introducing into the selector any ripples which may be reflected back from the square-wave generator.

Although the voltage signal c from either high-gain amplifier might be connected to the recorder switch, we have found it more desirable to lead the square-wave signal c put out by the square-wave generator to the recorder switch, after passing it through a filter to change it into a signal proportional to the average value of the square wave. When this is done, as shown in Fig. 3A, the necessity of giving the square-wave generator a linear characteristic is avoided. It may be noted that, as is usually the case in feedback systems, strict linearity is unnecessary in the amplifiers.

The four square-wave generators shown in Fig. 3A produce series of square waves of different frequencies. Each generator is so controlled by the signal which it receives that the ratio between the pulse length and the cycle length in the series of square waves which it generates varies with the received signal. The outputs of the four generators are, therefore, series of square waves representing the values $c$, $m$, $y$ and $n$.

Figure 4:
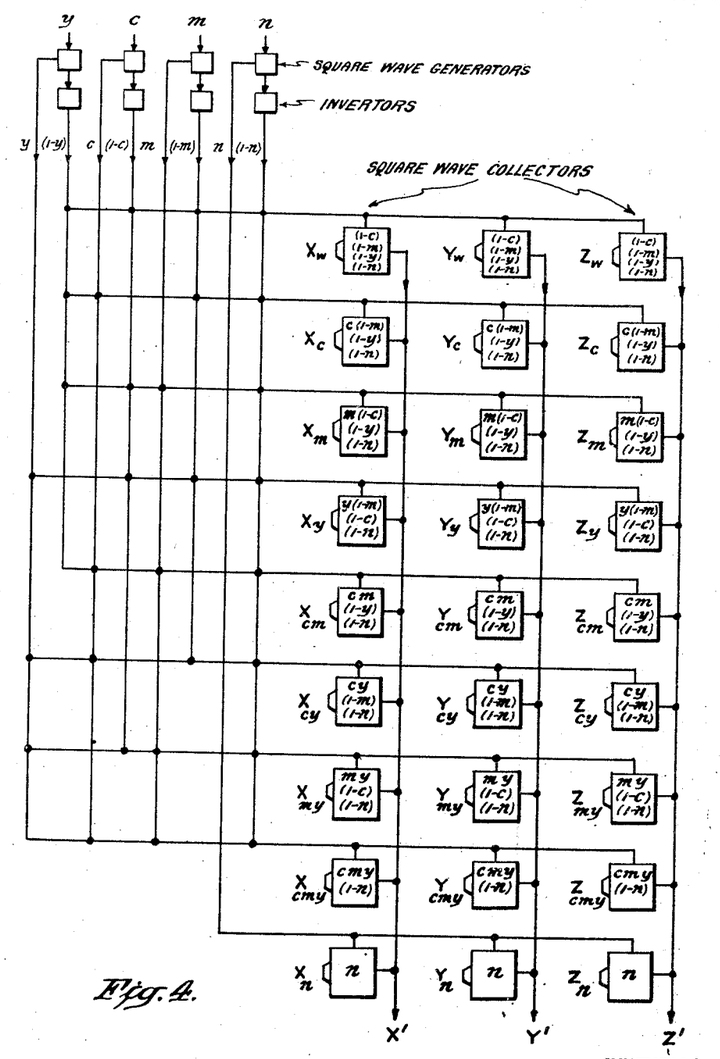
Fig. 4 is a block diagram of the circuits of the three computing channels indicated in Fig. 3A.

The four square-wave generators shown in Fig. 3A are also shown at the top of Fig. 4, which is a block diagram of the three computing channels shown in Fig. 3A. As shown in Fig. 4, the output of each square-wave generator is led into an inverter. Each inverter puts out a series of square waves in which the ratio of the pulse length to the cycle length is equal to one minus the signal which it receives. The four inverters, therefore, put out series of square waves representing the values $(1-c)$, $(1-m)$, $(1-y)$, $(1-n)$ respectively.

By the network shown in Fig. 4, the eight series of square waves from the square-wave generators and inverters are distributed among twenty-seven square-wave collectors to produce the twenty-seven products contained in Equations 5a, 5b, 5c. The nine square-wave collectors shown in the first column in Fig. 4 produce signals corresponding to the nine terms on the right-hand side of Equation 5a. Thus, the first of these collectors has its input connected to receive the series of square waves corresponding to $(1-c)$, $(1-m)$, $(1-y)$ and $(1-n)$, and produces a signal which is equal to the proportion of the time in which pulses occur simultaneously in all four series, and, therefore, proportional to the product $$(1-c)(1-m)(1-y)(1-n)$$

In order that the output of this collector may represent the first term of Equation 5a, the constant $X_w$ is set into the collector before the start of operations.

The other collectors in the first column are connected and adjusted to produce signals corresponding to the other terms on the right-hand side of Equation 5a and the outputs of these collectors are fed by a common conductor into a low-pass filter so that they are added to produce the computed signal X', the computed value of the right-hand side of Equation 5a based on the values of the signals $c$, $m$, $y$, $n$ which control the four square-wave generators.

The collectors in the other two columns produce the signals Y', Z' in the same manner.

Figure 5:
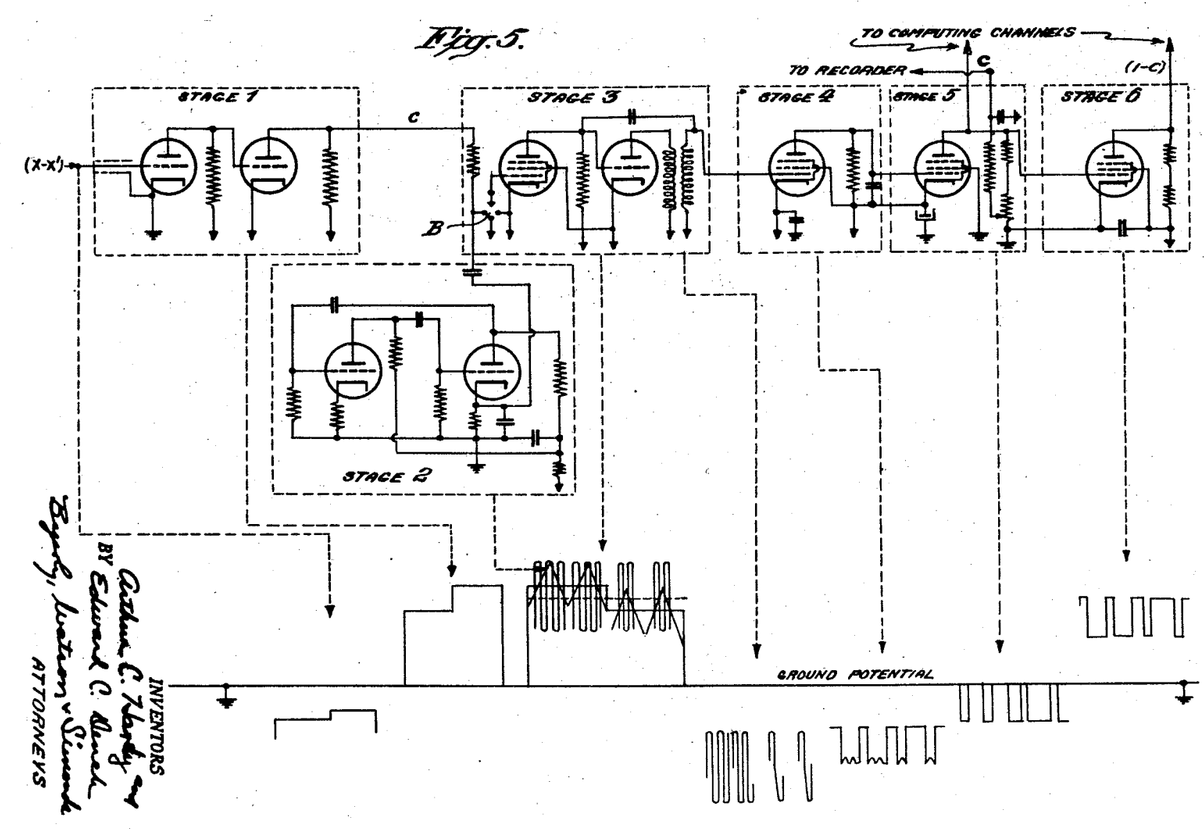
Fig. 5 is a diagram of the circuit including one of the amplifiers A—1 indicated in Fig. 3A, one of the square-wave generators indicated in Figs. 3A and 4, and one of the inverters indicated in Fig. 4.

Fig. 5 illustrates a desirable arrangement of the circuits of the high-gain amplifiers, square-wave generators and inverters. This circuit diagram includes one of the high-gain amplifiers A—1 shown in Fig. 3A, one of the square-wave generators shown in Figs. 3A and 4, and one of the inverters shown in Fig. 4. The lower part of the figure shows the form of the waves and the potential to ground in the different stages of the circuit for the input signal indicated.

Stage 1 of the circuit illustrated in Fig. 5 is a high-gain D. C. amplifier containing two triodes. The signal voltage (X—X') from one of the subtractors is amplified in stage 1 to produce the signal voltage c (see Fig. 3A and Fig. 4) which is fed to stage 3.

Stages 2, 3, 4 and 5 of the circuit shown in Fig. 5 constitute the square-wave generator for the signal c shown in Fig. 3A and Fig. 4.

Stage 2 is a conventional triangular wave generator and stage 3 is an oscillator trigger circuit which, when triggered, generates a wave of much higher frequency than that of the triangular wave generated in stage 2.

The triangular wave voltage from stage 2 and the signal voltage c from stage 1 are added and applied to the trigger circuit of stage 3. When the sum of the triangular wave voltage and the signal voltage exceeds the critical trigger voltage, the oscillator of stage 3 is triggered and continues to oscillate until the signal voltage plus the triangular wave voltage falls below this critical trigger value. The per cent. of time that the oscillator is on is proportional to the signal voltage. As a result, the oscillator produces groups of waves of high frequencies separated by spaces as indicated in the diagram below stages 2 and 3 of the circuit. The frequency of the groups of high-frequency waves is the frequency of the triangular wave generated in stage 2, while the ratio of the length of each group of waves to the length of the cycle is equal to the signal voltage c.

The groups of oscillations from stage 3 are fed into stage 4 which is a detector which converts them into pulses of D. C. constituting a conventional square wave. These square-wave pulses are sent to a power amplifier which is stage 5 of the circuit. When the output of stage 4 is applied to the grid of the power amplifier of stage 5, the residual ripple occurs below the cut-off grid voltage and hence does not appear in the output of stage 5 (see wave form shown below stages 4 and 5).

The output of stage 5 is a train of square waves corresponding to the signal c which is distributed among the various square-wave collectors by the network shown in Fig. 4. This output is also fed to an inverter forming stage 6 of the circuit. The output of the inverter is a train of square waves containing the signal $(1-c)$ and is distributed among the square-wave collectors by the network shown in Fig. 4.

Stage 5 also incorporates one of the filters F shown in Fig. 3A, which converts the train of square waves into a voltage signal which is led to the recorder switch as shown in Fig. 3A.

The arrows along the bottoms of the different stages of the circuits shown in Fig. 5 indicate connections to D. C. potentials. The biases to be used are indicated by the diagram at the bottom of Fig. 5 which shows the voltage relation between each stage and ground.

Figure 5A:
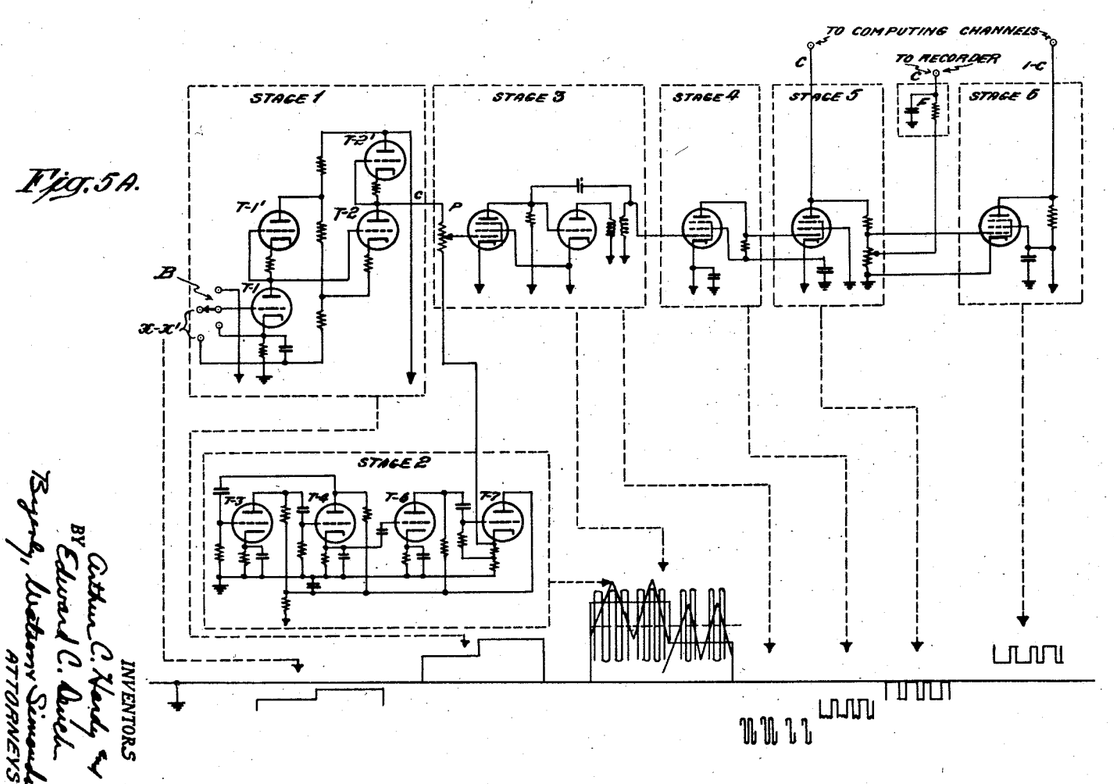
Fig. 5A is a diagram of a circuit similar to Fig. 5 showing further details of a preferred embodiment.

While the circuit of Fig. 5 has proved satisfactory, we prefer to use the slightly more complicated circuit shown in Fig. 5A. The amplifier of stage 1 of this circuit contains, in addition to two active amplifying triodes T—1, T—2, two balancing triodes T—1', T—2' to reduce drift. The triangular wave generator of stage 2 contains, in addition to the two triangular generator tubes T—3, T—4, voltage and power amplifiers T—6 and T—7. The outputs of stages 1 and 2 are fed to stage 3 through a potentiometer P which controls the effective gain of the entire circuit. Except with these additions, the circuit of Fig. 5A is the same as that of Fig. 5 which has been described and it operates in the same manner.

Figure 6:
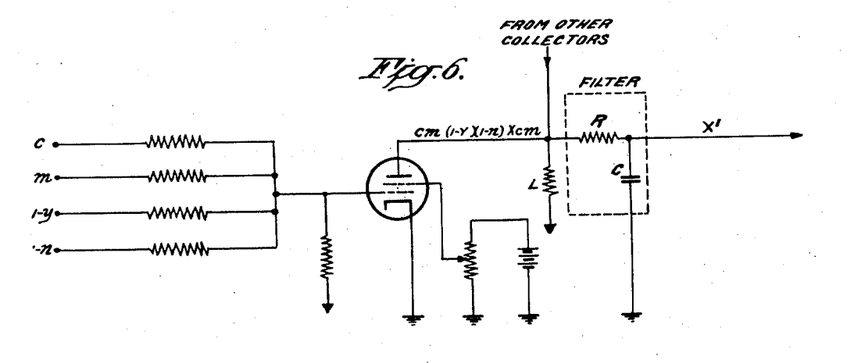
Fig. 6 is a circuit diagram of one of the square-wave collectors indicated in Fig. 4.

Fig. 6 shows one of the square-wave collectors indicated in Fig. 4. While the circuits of all the collectors are the same, the one shown may be taken to be the fifth one in the first column of Fig. 4 which computes the term $$cm(1-y)(1-n)X_{cm}$$

of Equation 5a.

At the left-hand side of Fig. 6 are shown leads from the square-wave generators and inverters producing square-wave signals representing the values $c$, $m$, $(1-y)$, $(1-n)$. These four leads are connected together and to the control grid of a multi-grid tube to produce a negative bias such that it cuts off the flow of plate current except when voltage pulses occur in all four connected leads simultaneously. Whenever this happens, the bias becomes sufficiently positive to permit the flow of plate current in the multi-grid tube. The amplitude of the pulses thus produced in the plate current of the multi-grid tube is controlled by the bias of the screen grid of the tube which is set by means of a potentiometer so as to represent the constant $X_{cm}$. The average plate current represents the product of the amplitude of the current pulses and the fraction of the time when such pulses exist. It is, therefore, proportional to the term $$cm(1-y)(1-n)X_{cm}$$

of Equation 5a. To obtain a signal proportional to the average plate current, the plate of the tube is connected to an R—C filter whose time constant is large enough to filter out the frequencies of the trains of square waves and beat frequencies so as to produce a D. C. voltage proportional to the average plate current. The time constant of the filter is, however, small enough to allow changes rapid enough to give adequate resolution at a satisfactory speed of scanning.

The tubes forming the other collectors shown in the first column in Fig. 4 are connected directly to the R—C filter shown in Fig. 6 in such manner that their plate currents pass through a load resistance L connected to the filter. The signal output voltage of the filter will, therefore, be proportional to the sum of the average plate currents in all of these tubes and will, therefore, be the required X' signal.

Figure 7:
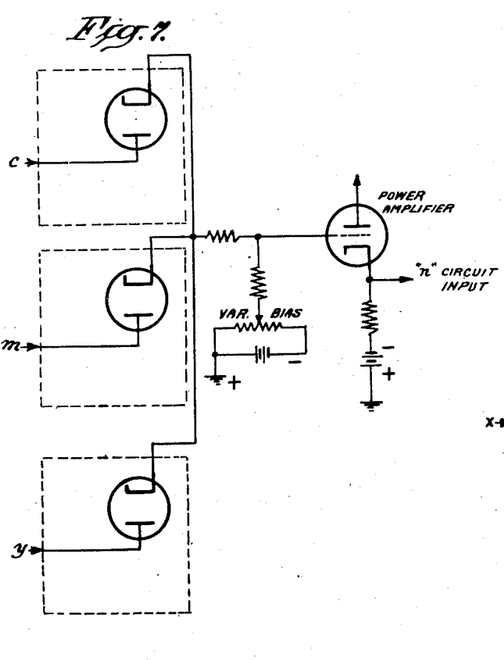
Fig. 7 is a circuit diagram of the selector indicated in Fig. 3A.

Fig. 7 shows the circuit of the selector which is shown in Fig. 3A. The selector includes three vacuum tube rectifiers having their cathodes connected to a common resistor. Voltages corresponding to the signals $c$, $m$ and $y$, obtained from the outputs of the amplifiers A—2 are fed to the anodes of the three rectifiers. Each voltage becomes more positive as the signal which it represents decreases. At any one time, only the rectifier to which the largest voltage is applied is conductive, so that the voltage drop built up on the resistor connected to the three cathodes is always equal to the most positive one of the three voltages which corresponds to the smallest one of the values $c$, $m$, and $y$. The voltage drop across the resistor is fed through a power amplifier shown in Fig. 7 to a high-gain amplifier to produce the signal $n$ which is then converted into a square wave. The signal $1-n$ may be obtained from the signal $n$ by an inverter. This may be done by connecting the output of the circuit shown in Fig. 7 to the input of stage 1 of a circuit which is precisely like that shown in Fig. 5. The square waves corresponding to $n$ and $(1-n)$ are distributed by the network shown in Fig. 4.

As pointed out in column 4, a practical arrangement may be provided by giving $n$ any value which is not greater than its critical value. In case it may be desired to use a value of $n$ less than the critical value, the variable bias shown in Fig. 7 may be used to increase the voltage which generates the signal $n$.

Figure 8:
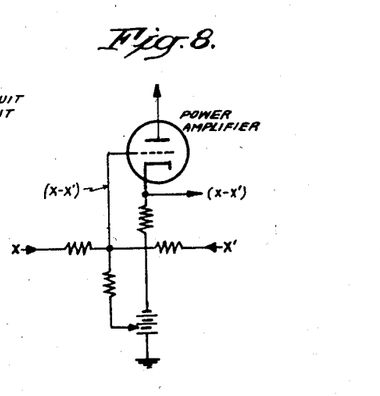
Fig. 8 is a circuit diagram of one of the subtractors indicated in Fig. 3A.

Fig. 8 shows one of the subtractors indicated in Fig. 3. It consists of two resistors whose outer ends are connected to one of the photocells and to the output of one of the computing channels so as to add voltages of opposite polarity corresponding to the signals X and X'. The algebraic sum of the two voltages which is equal to the difference between the values which the voltages represent is led off by a conductor from the connected inner ends of the resistors and passed through a power amplifier in order to lower the output impedance. The signal X—X' from this power amplifier is led into the amplifier forming the first stage of the circuit shown in Fig. 5 to generate the signal $c$. For convenience, a potentiometer may be connected to the output point of the subtractor to control the relation to ground of the voltage (X—X').

The operation of the machine which has been described is apparent from the description which has been given but some details as to adjusting the illustrative circuits may be noted.

The range of variation of the quantities $c$, $m$, $y$ and $n$ which are to be recorded to make the corrected separation images must be coordinated with the variation in the amount of light received by the photocells during the scanning of the uncorrected images. The maximum light may be taken as the light which reaches the photocells when the lightest patches of the color chart $P_w$ are between the scanning lamps and the photocells. The minimum or "zero" light may be taken as the light which reaches the photocells when the darkest patches of the color chart $P_n$ are between the scanning lamps and the photocells. The biases in the $c$, $m$, $y$ and $n$ circuits or the illumination of the transparencies or both are adjusted in such a way that the variation of the signals to be recorded from their minimum or zero values to their maximum or 100% values causes a variation in the calculated values X', Y' and Z' equal to the variation in the photocell signals between the signals produced by light through the patches $P_n$ and the signals produced by light through the patches $P_w$.

After the range of the apparatus has been adjusted, the constants of the equations are set in by adjusting the potentiometer controlling the screen grid bias of the tube of each of the twenty-seven square-wave collectors shown in Fig. 4. The tube and potentiometer of each collector are similar to that shown in Fig. 6 and the knobs shown in Fig. 4 indicate means for controlling the potentiometers.

Each of the patches of the color chart represents a color in which the proportional area of each ink printed is either zero or 100%. The adjustment of the potentiometers is, therefore, a simple matter. Thus, the white patch $P_w$ of each of the three separation transparencies is placed over the photocells and the potentiometers of the collectors of the first row shown in Fig. 4 are adjusted so as to make each of the signals $c$, $m$, $y$ and $n$ put out by the apparatus equal to zero. The patch $P_c$ is then viewed by the photocells of the machine and the potentiometers of the collectors of the second row are adjusted to make the signal $c$ equal to 100% and the other signals each equal to zero. By viewing the successive patches, the potentiometers of the collectors of each of the other rows of Fig. 4 are similarly adjusted. The adjustment of the potentiometers when each patch is viewed may be simplified by holding three of the four signals at the desired maximum or minimum values by "brute force" by means of the switch B shown in Fig. 5 while the potentiometer corresponding to the remaining signal is being adjusted.

This method of setting in the constants has the advantage of determining the intensities of spectral components of the colors of the inks and overprints by their effect on the computing circuits of the machine, so that actual numerical measurement of them is unnecessary. It is apparent that this method results in adjusting the computing apparatus to make corrected color-separation images which will exactly reproduce the color of each patch of the color chart. Other ways of measuring and setting in the constants have the same effect. Thus, for example, the transparencies of the patches of the separation photographs of the color chart may be measured on the machine or by other means, and the measured values may be set into the machine by the use of meters.

Since the separations of the color chart are made by means of the same filter-emulsion combinations as the separations of the colored original which is to be reproduced, it is evident that all these methods of setting in the constants involve determining the intensities of three spectral components of the colors on the chart which are the same spectral components as those of the original which are later fed to the machine. When the filter-emulsion combinations are linear transformations of the mixture curves for some set of basic stimuli, the spectral component intensities measured are the tristimulus values of the colors on the chart in the same colorimetric system as that in which the intensities of the spectral components of the colored original to be fed to the computing apparatus represent the tristimulus values of the colors of successive elements of the original.

When the intensities of the color components of the original which are to be fed to the computing machine are true tristimulus values in some known colorimetric system, it is not essential to measure the intensities of the same spectral components of the colors on the color chart, for the required tristimulus values of the colors of the chart in the required photometric system may, if desired, be obtained by computations based on spectrophotometric measurements of the patches of the color chart.

While setting in the constants is an essential step in our new method of color reproduction, it should be noted that since these constants depend upon the colors of the reproduction inks and the paper on which they are printed, it is necessary to set in the constants only once when a number of different originals are to be reproduced by means of the same reproduction inks and the same paper.

While the method and apparatus which have been described are adapted to prepare separation images for making the plates of a four-color process, it is evident that they are equally well adapted for supplying corrected color-separation images for the plates of a three-color process. When the apparatus is used for this purpose, all the $n$ circuits are disconnected. If the apparatus is to be used only for the three-color process, the circuits indicated by the dot and dash lines in Figs. 3 and 3A may be altogether omitted. When the apparatus is used in this manner, it serves to solve three Neugebauer Tristimulus Equations 1a, 1b, 1c. So far as we are aware, our method and apparatus has for the first time made possible the solution of the Neugebauer equations.

When applied to the four-color process, the method utilizes the color stimuli of all possible overprint combinations of the four inks and a set of three uncorrected color-separation images for the making of plates from which accurate reproduction may be made by the four-color method.

When applied to three-color reproduction, the method utilizes the color stimuli of all possible overprint combinations of three colored inks and a set of three uncorrected separation images to produce a set of corrected images for the engraving of plates for the three-color process. The method may obviously be extended to cases in which more than three colored inks and more than three separation images are used in order to secure a larger color gamut.

In either case, it makes simultaneously two types of correction, one of which has heretofore been made separately. An analysis of the Neugebauer equations shows that the first four terms of Equations 6a, 6b, 6c take account of the difference between the colors of the reproduction inks and the colors of the basic stimuli assumed in the selection of the filters. The parts of the apparatus which calculate the first four terms of Equations 6a, 6b, 6c, therefore, result in making the same correction as was made by the method described in Hardy Patent 2,165,168, issued July 4, 1939. The remaining terms of the Neugebauer equations introduce the correction required by the fact that the spectral energies of the three colored inks overlap so that the primaries of a printed reproduction are unstable, as pointed out in Hardy Patent 2,165,167, issued July 4, 1939. The parts of the apparatus which compute these remaining terms of the equations, therefore, introduce the correction required by the overlapping spectra of the inks.

By effecting both these corrections—that required by the difference in color between the reproduction primaries and basic stimuli and that required by the overlapping of the absorption spectra of the inks—the method for the first time produces automatically color-separation images capable of giving a correct reproduction by superimposed prints.

Besides doing away with the necessity for hand retouching, the method of this invention makes it unnecessary to select colored inks whose absorption spectra overlap to a minimum extent. It is, therefore, unnecessary to use the type of inks now selected as "process inks." Any three colored inks may be used and the selection of the inks may be based on the particular color gamut required to reproduce any particular original.

In the description of the invention which has been given, it has been assumed that the methods of engraving and printing carried out by means of the corrected separation images produced by the machine are such that the size of the dots which are printed is the same as that of the dots of the corrected images. In the case of the use of a method of engraving or a method of printing which involves a non-linear relationship between the size of the dots of the separation image and the size of the printed dots, appropriate modifications may be introduced in the electric circuit or the optical system of the recorder to compensate for this non-linearity.

Special modifications may also be introduced in the electrical circuit or the optical system of the recorder to meet particular printing requirements of particular processes. Thus, limits may be placed on the electrical or optical system to prevent the absence of any dot structure in any part of the printing plate or to prevent a solid structure in any part of the plate.

While in the method and machine which have been described uncorrected color separations are first made and each of them is then scanned, it is evident that the method may be carried out by scanning a colored original by means of three photocells provided with appropriate color filters, as in this case the light flux received by each photocell will be a spectral component of the original as in the specific arrangement shown.

This application is a continuation-in-part of our co-pending application Serial No. 543,990, filed July 8, 1944, and now abandoned in favor of the present application. The equation-solving apparatus and the multiplying apparatus described herein form the subject-matter of our co-pending applications Serial No. 467,042, filed November 26, 1942, Serial No. 688,750, filed August 6, 1946, and Serial No. 713,658, filed December 3, 1946.

What is claimed is:

1. In the method of making corrected color-separation images for reproduction of a colored original by superimposed prints from structured printing plates in which electric signals representing different spectral components of the colored original are modified by one another, the new step which consists in utilizing the color stimuli of overprint combinations of the reproduction inks to control the extent of such modification.

2. In the method of making corrected color-separation images for reproduction of a colored original by superimposed prints from structured printing plates in which electric signals representing different spectral components of the colored original are modified by one another, the new step which consists in utilizing the color stimuli of the material on which the reproduction is to be printed, of each ink to be used in the reproduction and of all possible overprint combinations of said inks to control the extent of such modification.

3. In the method of making a set of corrected color-separation images for a reproduction of a colored original by superimposed prints from structured printing plates which comprises making different additive and subtractive combinations of three uncorrected separation images in accordance with predetermined combining factors, the new steps which comprise determining the color stimuli of overprint combinations of the inks to be used in the reproduction and utilizing said determinations to adjust the combining factors.

4. In the method of making corrected color-separation images by feeding electric signals corresponding to the intensities of three different spectral components of the colors of successive elements of the colored original to interconnected electric circuits and recording the outputs, the steps of determining the intensities of the same three spectral components of the colors of overprint combinations of the reproduction inks, and adjusting said circuits in accordance with such determinations to control the extent to which each circuit contributes to the recorded result.

5. In the method of making corrected color-separation images of a colored original by feeding to an electrical computing apparatus electric signals corresponding to the intensities of three different spectral components of the colors of successive elements of the colored original, the steps of determining the intensities of the same three spectral components of the colors of overprint combinations of the reproduction inks, and adjusting the computing apparatus in accordance with said determinations.

6. In the method of making corrected color-separation images of a colored original by feeding to an electrical computing apparatus electric signals corresponding to the intensities of three different spectral components of the colors of successive elements of the colored original, the step of adjusting the computing apparatus in accordance with the intensities of the same three spectral components of the color of at least one overprint combination of the reproduction inks.

7. In the method of making corrected color-separation images for reproduction of a colored original by superimposed prints from structured printing plates by feeding to an electrical computing apparatus electric signals corresponding to three tristimulus values of the color of each successive element of the colored original, the steps of determining the tristimulus values in the same colorimetric system of the material on which the reproduction is to be printed, of each ink to be used in the reproduction and of an overprint combination of the inks, and adjusting the computing apparatus in accordance with said determinations.

8. In the method of making corrected color-separation images for reproduction of a colored original by superimposed prints from structured printing plates in which electric signals corresponding to the intensities of three different spectral components of the color of each successive element of the colored original are fed to electrical computing apparatus and the results of the computation are recorded, the new steps of establishing electric signals corresponding to the intensities of the same three spectral components of the colors of the inks to be used in the reproduction and of overprints of said inks, and electrically computing from these signals and the signals corresponding to the intensities of the color components of the original the proportional printing area for each ink required in each element of the reproduction.

9. In the method of making a reproduction of a colored original by superimposed prints from structured printing plates, the steps of determining the tristimulus values of the material on which the reproduction is to be printed, of each ink to be used in the reproduction and of overprint combinations of said inks, establishing electric signals representing the tristimulus values in the same colorimetric system of successive elements of the colored original, and electrically computing from said electric signals and the aforesaid tristimulus value determinations the proportional printing area for each ink required in each element of the reproduction to reproduce the color stimulus of the corresponding element of the original, and separately recording the results of the electric computation for each ink to provide corrected color-separation images from which the plates may be made.

10. In the method of making a reproduction of a colored original by superimposed prints from four structured printing plates, the steps of determining the tristimulus values of the material on which the reproduction is to be printed, of each colored ink to be used in the reproduction, of each possible overprint combination of said inks and of a black ink to be used in the reproduction, establishing electric signals representing the tristimulus values in the same colorimetric system of successive elements of the colored original, and electrically computing from said electric signals and the aforesaid tristimulus value determinations the proportional printing area for each colored ink and for the black ink required in each element of the reproduction to reproduce the color stimulus of the corresponding element of the original, and separately recording the results of the electric computation for each ink to provide four corrected color-separation images from which the four plates may be made.

11. The method of making corrected color-separation images which comprises making a set of three color-separation photographs from a colored original, making a set of corresponding color-separation photographs of a color chart having patches exhibiting the color of the material on which the reproduction is to be printed, the color of each of the inks to be used in the reproduction and the color of each possible overprint combination of the inks, making different additive and subtractive combinations of the separation photographs of the original in accordance with combining factors, and utilizing the separation photographs of the color chart to determine the combining factors.

12. The method of making corrected color-separation images, which comprises making a set of three color-separation photographs of a colored original, making a corresponding set of color-separation photographs of a color chart having patches exhibiting the colors of the reproduction inks and of overprints of said inks, establishing electric signals corresponding to the transparencies of the patches of the separation photographs of the color chart, establishing electric signals corresponding to the transparencies of successive elements of the separation photographs of the colored original, and electrically computing from the two sets of electric signals the printing area for each reproduction ink required in each element of the reproduction.

13. In the method of making corrected color-separation images for reproduction of a colored original by superimposed prints from structured printing plates in which the intelligence of three color components of a colored orginal is communicated to electrical computing apparatus and the results of the computation are recorded, the new steps of making a color chart with the inks to be used in the reproduction having patches exhibiting the material to be printed on, each ink printed alone and each possible overprint combination of the inks, communicating the intelligence of the same color components of the chart to the computing apparatus and electrically computing from the intelligence of the color components of the chart and the intelligence of the color components of the original the proportional printing area for each ink required in each element of the reproduction to reproduce the color stimulus of the corresponding element of the original.

14. The method of making corrected color-separation images which comprises making a set of three color-separation photographs from a colored original, making a set of corresponding color-separation photographs of a color chart having patches exhibiting the color of the material on which the reproduction is to be printed, the color of each of the inks to be used in the reproduction and the color of each possible overprint combination of the inks, communicating the intelligences of the separation photographs of the original to interconnected electrical circuits and recording the outputs, and adjusting said circuits in accordance with the intelligence of the separation photographs of the chart to control the extent to which each said circuit contributes to the recorded result.

15. In the method of making corrected color-separation images by feeding electric signals corresponding to the transparencies of successive elements of color-separation photographs of a colored original made with three filter-emulsion combinations of different spectral sensitivities to interconnected electric circuits and recording the outputs, the steps of making a color chart having patches exhibiting the colors of reproduction inks and of overprints of said inks, making color-separation photographs of the chart with three filter-emulsion combinations of the same spectral sensitivities as those used in making the separation photographs of the original, and adjusting said circuits in accordance wth the transparencies of the patches of the separation photographs of the chart to control the extent to which each circuit contributes to the recorded result.

16. In the method of color reproduction by means of a computing machine for solving simultaneous color equations, the steps of adjusting the machine to reproduce correctly the colors of the reproduction inks and of overprint combinations of the reproduction inks, and thereafter feeding to the machine color components of successive elements of the colored original to be reproduced.

17. In color reproduction, the method which comprises generating arbitrary signals to represent the proportional printing areas of corresponding elements of a number of printing plates, electrically computing from said signals the color stimulus of said element of a reproduction to be made by prints from said plates, comparing the computed color stimulus with the color stimulus of the corresponding element of the colored original, and changing said signals until the computed color stimulus and the color stimulus of the original are substantially the same, so that said signals indicate the proportional printing areas required to reproduce the color of the original.

18. Apparatus for making corrected color-separation images for use in making reproductions of a colored original by superimposed prints from structured plates, comprising three signal generators, means connected to said generators for computing the three tristimulus values of a color reproduction made by prints from three printing plates whose proportional printing areas correspond to the three signals, means for subtracting the three computed tristimulus values from the three corresponding tristimulus values of a colored original to obtain three differences, means actuated by one of the differences to control the generator of one of the signals to change said signal until said difference is reduced substantially to zero, and similar simultaneously operating control means for the other generators actuated by the other ones of said differences.

19. Apparatus for making corrected color-separation images for use in making four color reproductions of a colored original by superimposed prints from four structured printing plates, which comprises four signal generators, means connected to said generators for computing the three tristimulus values of a color reproduction made by prints from four printing plates whose proportional printing areas correspond to the four signals, means for subtracting the three computed tristimulus values from the three corresponding tristimulus values of a colored original to obtain three differences, means actuated by said differences to control three of the signal generators until said differences are reduced substantially to zero, separate simultaneously operating means for selecting the smallest one of the signals from these three generators, and means actuated by the selected signal to control the fourth signal generator until said selected signal is reduced substantially to zero.

20. In apparatus for making corrected color-separation images for use in making four-color reproductions of a colored original by superimposed prints from four structured printing plates, which comprises recording means and three photocell circuits and means for establishing in them signals corresponding to three different spectral components of the colored original, the combination of three computing channels arranged to perform the mathematical operations required by the four-color tristimulus equations, means for generating four arbitrary signals to represent the values $c$, $m$, $y$ and $n$ of said equations and feeding them to the computing channels, means for opposing the signals of the three photocell circuits to the outputs of the three computing channels, means for utilizing the difference between each pair of opposed signals to modify the relation between the signals representing the quantities, $c$, $m$, $y$ and $n$ until each such difference is reduced substantially to zero, separate simultaneously operating means for selecting the smallest one of the $c$, $m$, and $y$ signals and utilizing it to modify the $n$ signal until such smallest one is reduced substantially to zero, and means for feeding the $c$, $m$, $y$ and $n$ signals to the recording means.

21. Apparatus for making corrected color-separation images for use in making four-color reproductions of a colored original by superimposed prints from four structured printing plates, which comprises three photocell circuits and means for establishing in them signals corresponding to three different spectral components of a colored original, three computing channels arranged to perform the mathematical operations required by the four-color tristimulus equations, three subtracting devices of which each has an input terminal connected to the photocell circuit and the computing channel corresponding to one of said three equations, three amplifiers having their input connected separately to the outputs of the three subtracting devices and their outputs connected to all three computing channels, a selector for selecting the smallest one of several signals connected to the outputs of said three amplifiers, a fourth amplifier having its input connected to the output of the selector and its output connected to the computing channels, and means for recording the outputs of the four amplifiers.

22. In apparatus for making corrected color-separation images for use in making reproductions of a colored original by superimposed prints from structured printing plates, which includes three photocell circuits and means for establishing in them signals corresponding to the three different spectral components of the original, the combination of three computing channels arranged to perform the mathematical operations which the Neugebauer tristimulus equations indicate as to be performed on the quantities $c$, $m$ and $y$, means for generating arbitrary signals representing the quantities $c$, $m$ and $y$ and feeding them to the computing channels, means for opposing the signals corresponding to the three spectral components of the colored original to the signals put out by the computing channels, and means for utilizing the difference between each pair of opposed signals to modify the signal representing one of the quantities $c$, $m$ and $y$ until all said differences are reduced substantially to zero, so that the correct values of $c$, $m$ and $y$ may be recorded.

23. Apparatus for making corrected color-separation images for use in making a reproduction of a colored original by superimposed prints from structured plates, which comprises three photocell circuits and means for establishing in them signals corresponding to three different spectral components of the original, three computing channels arranged to perform the mathematical operation required by the three Neugebauer tristimulus equations, three subtracting devices of which each has its inputs conected to the signal circuit and the computing channel corresponding to one of said three equations, three amplifiers having their outputs connected to the computing channels, a feed back connection between the output terminal of one of the subtraction devices and the input of one of the amplifiers, a second feedback connection between another one of the subtraction devices and another one of the amplifiers, a third feedback connection between the third subtraction device and the third amplifier, and means for recording the outputs of the three amplifiers.

24. The method of determining the probable areas of the different overprints obtainable from a number of structured printing plates, which comprises generating a number of series of rectangular signal waves having irrationally related frequencies and making the lengths of the impulses in each series correspond to the proportional printing area of one of the printing plates, and determining the percentage of time in which impulses occur simultaneously in various combinations of said series to obtain the probable areas of overprints from corresponding combinations of the printing plates.

25. Electrical apparatus for correcting color-separation images for color reproduction by printing, comprising three circuits, means for establishing in said circuits signals corresponding to the point-to-point variation in transparency of three uncorrected color-separation photographs taken through color filters, means for modifying said signals to correct them for the difference in color between the filters and the inks to be used in the reproduction, simultaneously operating means for modifying said signals to introduce the correction required by the overlapping spectra of the inks to be used in the reproduction, and means for recording the signals as modified by said two simultaneously acting means to produce theoretically correct color-separation images.

ARTHUR C. HARDY.
EDWARD C. DENCH.

REFERENCES CITED

The following references are of record in the file of this patent:

UNITED STATES PATENTS

| Number | Name | Date |
|---|---|---|
| 2,253,086 | Murray | July 19, 1941 |
| 2,316,581 | Hardy | Apr. 13, 1943 |
| 2,231,668 | Hall | Feb. 11, 1941 |
| 2,286,750 | Hall | June 16, 1942 |
| 2,183,525 | Yule | Dec. 19, 1939 |
| 2,413,706 | Gunderson | Jan. 7, 1947 |

Certificate of Correction

Patent No. 2,434,561. January 13, 1948.

ARTHUR C. HARDY ET AL.

It is hereby certified that errors appear in the printed specification of the above numbered patent requiring correction as follows: Column 3, under the heading "Four-color space-vector equation" in the right-hand portion of line 17, for "$(1-y)S_{cm}$" read $(1-y)S_{cmn}$; line 64, for "from" read *form*; column 5, line 12, for "tristmulus" read *tristimulus*; line 26, for "Equations 5" read *Equations 5a*; column 6, line 11, for "equation" read *equations*; line 34, for "compueted" read *computed*; column 9, line 41, for "consttiutes" read *constitutes*; column 22, line 40, for "operation" read *operations*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*